3,049,443
PROCESS OF DYEING SYNTHETIC FIBERS WITH
o-HYDROXYBENZOPHENONES
Ralph A. Coleman, Middlesex, N.J., assignor to American
Cyanamid Company, New York, N.Y., a corporation
of Maine
No Drawing. Filed Jan. 7, 1959, Ser. No. 785,307
16 Claims. (Cl. 117—138.8)

This invention relates to a process of dyeing hydrophobic polymeric materials with ultraviolet absorbers, and more specifically it relates to a process for dyeing hydrophobic polymeric materials such as super-polyesters, super-polyamides, polyacrylonitriles, and cellulose acetate with hydroxybenzophenones of the structure:

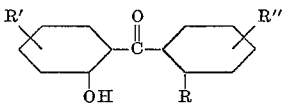

in which R is selected from hydrogen and hydroxyl and R' and R" may be hydrogen, alkoxy, alkenyloxy, chloro, bromo, alkyl or hydroxyl. Still more particularly, it relates to blends of dyeing assistants and benzophenones of the above class for use in promoting increased light fast dyeings of hydrophobic fibers.

In the past years, there have been developed a number of hydroxylated benzophenone derivatives which, when incorporated into synthetic resins, perform the very useful function of protecting the said resins from deterioration upon the action of light. These compounds fall into the general class of compounds known as ultraviolet absorbers. For example, U.S. Patent 2,693,492 discloses and claims one class of these ultraviolet absorbers, the 4,4'-dialkoxy-2,2'-dihydroxybenzophenones. Similarly, the application of Hardy, Forster and Coleman, Serial No. 592,509, filed June 20, 1956, now U.S. Patent 2,853,521, describes another class, the 2,2'-dihydroxy-4-alkoxybenzophenones and the application of Day, Hasler and Forster, Serial No. 356,792, filed April 3, 1953, now U.S. Letters Patent 2,777,828, discloses another and larger group of such compounds. The use made of these compounds as described in the literature, and as heretofore known, is the physical incorporation of these compounds within the polymer. The ultraviolet absorber is dispersed throughout the polymer, in order to give protection to the polymer, by being milled into the polymer or being deposited therein by codissolution in film forming solvents or by incorporation in the polymer during the polymerization.

I have discovered an entirely different way of protecting certain polymeric materials, a method which has heretofore been considered unusable. I have found that certain hydrophobic polymeric materials which are normally used in large quantities to make synthetic fibers can be dyed from a dyebath with these various ultraviolet absorbers with the result that these materials are strongly protected from the attack of ultraviolet light.

I have found that these ultraviolet absorbers have good substantivity and affinity on these hydrophobic materials, especially when in fiber form, and that this substantivity can be achieved even from aqueous dye baths having no carriers such as are usually used to disperse ultraviolet absorbers into polymers. These hydroxylated benzophenones differ greatly from the usual structure of dyestuffs and it is most surprising to discover that they have substantivity on these hydrophobic materials. This substantivity, I have found, is apparently achieved by the ability of the ultraviolet absorber to penetrate these hydrophobic materials under the dyeing conditions. Consequently, the fiber is protected against deterioration by having a surface composed of solid solution of UV absorber. This is a much more efficient use of the ultraviolet absorber than incorporation throughout the resin material. The ultraviolet light is met at the surface of the material with a concentrated barrier of the available absorber.

The process of my invention contemplates generally the application of the ultraviolet absorber from an aqueous dyebath in the same general manner in which dyestuffs are applied to fibers of these materials. The benzophenones, being insoluble in water, are dispersed in one way or another in the dyebath. The material is immersed therein and the dyebath is heated. Alternatively the dyebath is hot before the polymeric material is immersed, but the former method appears to give better exhaustion.

In the process of my invention the hydroxylated benzophenone is dispersed in water in one of a number of ways. One such is in a solution of tetrasodium pyrophosphate. These dispersed particles when applied at temperatures of 140–200° F., partially penetrate the hydrophobic material and are consequently fast to crocking and rubbing off.

Alternatively, the hydroxylated benzophenones can be dyed on these hydrophobic materials from a dyebath formed from the addition of an alcoholic solution of said benzophenone to water. For example, a 50 mg. sample of the hydroxylated benzophenone can be dissolved in 5 g. of ethanol and the resulting 1% solution can be stirred into 200 g. of water. The resultant dispersion can readily be applied to a 5-g. skein of hydrophobic fiber at temperatures from 160–200° F. Such a dyebath has a concentration of 0.025% hydroxybenzophenone or 1% on the weight of the fiber.

Another, and even better way of applying these benzophenone UV absorbers to the resin materials, especially in fiber form, is to use an emulsion prepared in the manner described in the copending application of Mecco, Carlino, and Zimmerman, Serial No. 437,558, filed June 17, 1954, now U.S. Patent No. 2,881,045, for applying dyes generally to these hydrophobic fibers. This method uses as a dyeing assistant an emulsion of an ester of an aromatic monocarboxylic acid. A dyebath comprising such an emulsion in which the UV absorber has been substituted for the dyeing assistant or added in addition to the dyeing assistant, is a highly efficient method of applying the UV absorber to the hydrophobic polymeric material, giving exhaustion as high as 90% of the UV absorber in the dyebath. In this method, as in the others, dyes may be included in the dyebath also, in order to effect a simultaneous dyeing and ultraviolet protection. The dyes color the polymeric materials independently and thus any normal dyeing of such materials can be used simultaneously to give UV protection, an enormous advantage of my invention. The dyes used can be either in emulsion form or in solution in the dyebath as is normal for those particular dyes, when being applied.

In order to get satisfactory protection of resins, it is usually necessary to incorporate at least 0.1%, by weight, of UV absorber. In the process of my invention, because the UV absorber is applied to the surface, a lower minimum suffices, especially with thicker articles such as molded plastics. A minimum of 0.02% of the weight of the polymeric materials should be present in the dyebath. It is preferable to use 0.1–1% of the UV absorber on the weight of the polymer. When the polymeric material is in the form of fibers, the greatly increased surface area makes it preferable to use larger quantities, often as much as 0.5–5.0% of the weight of the polymeric material. Increased amounts over such preferable usages, of course, give increased protection, but economic factors limit such high usage unless extraordinarily good protection is needed.

In order to get effective dyeing, a dyebath of 20 parts per part by weight of polymer to be dyed is customary. Thus, a minimum ratio of 1 part of UV absorber dispersed in 100,000 parts of water is needed. Higher concentrations are usually recommended, usages of the order of magnitude of 1 part per 2000 being preferable.

Among the hydroxylated benzophenones which may be used in the process of my invention to form the dyed materials of my invention, there may be used any of those in the patents and applications mentioned above, as well as in the pending applications of Forster, Serial No. 689,054, filed October 9, 1957, now U.S. Patent No. 2,892,872, and Hardy, Forster, and Coleman, Serial No. 709,753, filed January 20, 1958, now U.S. Patent No. 2,962,533, as fall in the class described by the above formula. Examples of such compounds are: 2-hydroxybenzophenone; 2-hydroxy-4-methoxybenzophenone; 2-hydroxy-4-ethoxybenzophenone; 2-hydroxy-4-butoxybenzophenone; 2,2'-dihydroxy-4,4'-dimethoxybenzophenone, and its higher homologs; 2,2'-dihydroxy-4-methoxy-4'-ethoxybenzophenone and its higher unsymmetrical homologs such as 2,2'-dihydroxy-4-methoxy-4'-propoxybenzophenone or 2,2'-dihydroxy-4-ethoxy-4'-butoxybenzophenone; 2,2'-dihydroxy-4-methoxybenzophenone and its higher homologs such as are described in the copending application of Hardy, Forster and Coleman, Serial No. 592,509, filed June 20, 1956, now U.S. Patent No. 2,853,521; 2-hydroxy-4-methoxy-4'-chlorobenzophenone; 2-hydroxy-4'-methoxy-2',4-dichlorobenzophenone and their corresponding bromo analogs; 2-hydroxy-4'-chloro-4-methoxybenzophenone; and its corresponding bromo analogs; 2,2',4'-trihydroxy-4-methoxybenzophenone and its higher homologs such as the thoxy, propoxy, butoxy, dodecyloxy, and octadecyloxy compounds; or 2,2',4,4'-tetrahydroxybenzophenone; or the allyl and other alkenyl analogs of these various types, as described in the copending application of Hardy, Forster and Coleman, Serial No. 709,753, filed January 20, 1958, now U.S. Patent No. 2,962,533.

The hydrophobic polymer materials which may be used in my invention include super polyamides such as hexamethylenepolyadipamide and polyomegaaminocaproamide (i.e., the nylons); superpolyesters, such as polymeric glycol terephthalate (sold under the name of Dacron), polyacrylonitriles, either as the homopolymer or copolymers with various comonomers such as vinyl pyridine, methylacrylate, vinyl chloride, and the like (polymers of various compositions of this type are sold under a variety of trademarks such as Orlon, Creslan, Acrylan, Dynel, and the like); and cellulose esters such as cellulose acetate. Preferably these hydrophobic polymeric materials are used in the form of fibers either as threads or as fabrics, and the process is treated as an ordinary one of dyeing. However, it is not limited to use the hydrophobic materials in this form, since I have found that a protection is obtainable even if the hydrophobic polymeric material is used in a bulk form such as a sheet of molded articles.

It is an advantage of my invention that the process is essentially the ordinary one of dyeing a fiber or other form of the hydrophobic polymeric material. The dyebath is formed, as has been described, either by dispersing the hydroxybenzophenone in aqueous tetrasodium pyrophosphate or by simple dispersion in water from an alcohol solution, or by any of the usual emulsion techniques of dyeing hydrophobic polymers. The polymeric material must be agitated as is customary in any dyeing process in order to get a level dyeing, or alternatively, the bath must be continuously agitated. Levelness is of special importance in the process of my invention, since without it there may be unprotected portions of the polymeric material. As in any dyeing process, the dyebath must be heated. Dyeing of the UV absorbers takes place best between 140 and 200° F.

It is an advantage of the dyed polymeric materials produced by my invention that they will absorb ultraviolet light in the range of 300 to 400 m$\mu$ and consequently the dyes with which the material may be colored as well as the polymeric material itself are protected from deterioration. The absorption occurs preferentially by the ultraviolet absorber leaving the polymer unattacked. It is a further advantage that the polymeric materials so dyed with hydroxylated benzophenones are protected from the degrading action of ultraviolet light. It is a still further advantage of my invention that films of polymeric material dyed with these ultraviolet absorbers may be used to reduce the transmission of ultraviolet light as, for example, in the center of a safety glass multi-layer.

The dyeing operation may be carried out either by direct addition of the polymeric material to a hot dye bath or by addition of the polymeric material to a cold bath, followed by gradual raising of the temperature to the dyeing range. Uniform results are more difficult to get when the hydrophobic material is added to a hot bath and are much more readily obtained by the process of gradual heating.

A further embodiment of my invention is the blend composition comprising a dyeing assistant and an ultraviolet absorber of the class described above. I have found that when a dyeing assistant, such as an emulsion of methyl salicylate, is blended with an ultraviolet absorber, such as 2,2'-dihydroxy-4-methoxybenzophenone, the blend composition is an exceptionally useful dyeing assistant which promotes the dyeing of hydrophobic fibers by the emulsion technique to give dyeings of increased light fastness over that obtained in the absence of the UV absorber. Such a blend is a highly useful article of commerce.

The carriers may be any carrier used to promote emulsion dyeing. Those described in the copending application of Mecco, Carlino and Zimmerman, Serial No. 437,558, now U.S. Patent No. 2,881,045, are especially useful. That application describes, as dyeing assistants, emulsions of the lower alkyl esters of carbocyclic aromatic monocarboxylic acids of not more than two carbocyclic rings, with methyl salicylate being a preferred species. Other known dyeing assistants include phenol, o-phenylphenol, p-phenylphenol, o-dichlorobenzene, monochlorobenzene, benzoic acid, toluic acids, salicyclic acids and the like. These likewise are usable in the blends of my invention. However, just as the emulsion carriers of Mecco et al. are highly preferable over these others, so such emulsions containing UV absorbers are much preferred over blends of the UV absorbers with other carriers.

The ultra-violet absorbers usable in these carrier blends are of course the same benzophenone derivatives described above. The amount used in the carrier emulsion is a function of the carrier usage in dyebaths. It is necessary, as stated above, to have a minimum of 1 part of UV absorber per 100,000 parts of dyebath under normal circumstances. With a normal usage of 15 parts of emulsion per 1,000 parts of dyebath, the emulsion should thus contain at least 1 part of UV absorber per 1,500 parts of carrier emulsion or 0.067%. However, if the usage of emulsion in the dyebath is increased, a lower quantity of UV absorber can be used. The minimum practical ratio of UV absorber to carrier, whether an emulsion carrier or the older types is 1 part UV absorber per 5,000 parts of carrier. Higher ratios are of course preferred, with one part of UV absorber per 30–300 parts of carrier emulsion or per 10–100 parts of the older types being recommended.

It is an advantage of these blends of my invention that they confer upon the dyes with which they are used additional light fastness over what is normally expected. Thus the dyer can take a dyestuff having a rating of 3 and get dyeings of light-fastness 4 or better, merely by using these blends rather than using the simple carriers alone.

The blends are prepared by mixing the UV absorber with the carrier. With liquid carriers, a solution is usually obtained. In the case of the emulsion carriers of Mecco et al. the UV absorber is dissolved in the carboxylic ester and the solution emulsified as described in their application.

This application is a continuation in part of my copending application Serial No. 716,889, filed February 24, 1958, now abandoned.

My invention can be illustrated by the following examples in which parts are by weight unless otherwise stated.

Example 1

50 parts of 2,2'-dihydroxy-4-methoxybenzophenone is pasted with 5 parts of 0.25% tetrasodium pyrophosphate and 0.25% sodium dodecyl sulfate solution. This is then diluted to 200 ml. with water. A piece of polyglycolterephthalate (Dacron) fabric weighing 5 parts is then entered into the cold dye bath (room temperature). The dye bath is gradually heated to 180° F., care being taken to turn the pieces in order to get uniform penetration. The dyeing is run at 180° F. for a short time after which it is rinsed well and dried.

The dyed piece is then measured for reflectance at 340 mµ. and compared with an undyed piece. The results:

| Control, percent | Dyed, percent |
|---|---|
| 34.0 | 17.0 | indicate that the ultraviolet absorber is present in the fiber.

At 180° F., when parts are grams, the dyeing was practically completed after 20 minutes, although the dyeing is usually given an hour. At 140° F.–160° F., longer dyeing times are required. At 200° F., good exhaustion of the dye from the bath is obtained in about 20 minutes.

Example 2

Four dye baths were prepared using the procedure of Example 1. Five-gram pieces of nylon, dry spun polyacrylonitrile fiber (Orlon), wet spun polyacrylonitrile containing small amounts of comonomers (Creslan) and cellulose acetate were entered into the respective baths, dyed, rinsed, and dried as in Example 1.

The percent reflectance of these dyed pieces was then measured at 340 mµ and compared with an undyed control. The results follow:

| Synthetic | Control | Dyed |
|---|---|---|
| Nylon | 20 | 14.5 |
| Orlon | 34 | 21.0 |
| Creslan | 28 | 13.0 |
| Acetate | 18.0 | 11.5 |

These results indicate definitely that the hydrophobic fibers have picked up the absorber from the dye bath.

Example 3

Dye baths are prepared as follows:

| Ingredients | No. 1 | No. 2 | No. 3 | No. 4 |
|---|---|---|---|---|
| Water | 200 parts | 200 parts | 200 parts | 200 parts. |
| 2-hydroxy-4-methoxy-benzophenone | | 25 parts (0.5%) | 50 parts (1.0%) | |
| 2,2'-hydroxy-4-methoxybenzophenone | | | | 5 parts (0.1%). |

Each absorber is pasted in a 5-parts solution containing 12.5 parts of sodium dodecyl sulfate and 12.5 parts of tetrasodium pyrophosphate and the paste is then added to 195 parts of water. A 5-part piece of nylon tricot is dyed in each bath by starting cold and heating in the bath with turning at 180° F. until dyeing is complete (about 1 hour when parts are grams). The pieces are then rinsed and dried. Reflectance curves at 400 mµ show that the absorbers have been picked up by the fabric:

Sample No.: Percent reflectance at 400 mµ
1 ---- 84
2 ---- 56
3 ---- 45
4 ---- 54

This shows as little as 0.1% 2,2'-dihydroxy-4-methoxybenzophenone (on the weight of the fiber) reduced the reflectance about 35% of the control and that 1.0% 2-hydroxy-4-methoxybenzophenone reduced the reflectance by about 46% of the control.

Example 4

200 mg. of 2,2'-dihydroxy-4-methoxybenzophenone are pasted in 20-ml. solutions containing 50 mg. sodium dodecyl sulfate and 50 mg. tetrasodium pyrophosphate. This was bulked to 800 ml. water in a 2-liter cylinder.

A 20-g. piece of 0.002" thick cellulose-acetate film (approx. 12" x 24") is fastened to two wooden rods and rolled intermittently from one rod to the other in the dye bath. The dyeing is started cold and continued at 180° F. for 1 hour. The film is then rinsed and dried. The dried film is wrinkled and slightly cloudy which condition is easily removed by hot pressing. The film (0.002" thick) has 2% transmission at 330 mµ.

Half a gram of the dyed film is dissolved in 250 ml. of acetone and tested for ultraviolet absorption at 330 mµ. Comparison is made vs. a 250-ml. acetone solution containing 0.5 g. of undyed acetate and 5 mg. of the dihydroxymethoxybenzophenone (the proper ratio of material if all the UV absorber were on the film). This measurement shows that 69% of the UV absorber in the original dye bath has been picked up by the film of cellulose acetate.

Example 5

5-g. skeins of cellulose acetate are dyed in 200-ml. baths prepared as follows:

| | |
|---|---|
| Absorber | 50.0 mg. |
| Sodium dodecyl sulfate | 12.5 mg. |
| Tetrasodium pyrophosphate | 12.5 mg. | dissolved in 5 ml. H$_2$O

After pasting, the mixture of the three components is bulked to 200 ml. with water to form the dyebath.

Baths are prepared with each of the following absorbers:

A. 2,2'-dihydroxy-4-methoxybenzophenone
B. 2-hydroxy-4-methoxybenzophenone
C. 2,2'-dihydroxy-4,4'-dimethoxybenzophenone
D. 2-hydroxybenzophenone
E. 4-hydroxybenzophenone (not a UV absorber)

One 5-g. skein is then entered into each dyebath (room temperature) and the bath gradually raised to 180° F. and held at this temperature for 1 hour. The skeins are turned intermittently. The dyed skeins are then washed with 0.5% soap solution, rinsed and dried.

The amount of absorber in each skein is determined spectrophotometrically by dissolving the acetate in acetone. A reference curve is run with the UV absorber plus acetate in acetone, care being used to add the same amount of absorber to the control as was initially present in the dyebath.

The results follow:

| Absorber | "A" | "B" | "C" | "D" | "E" |
|---|---|---|---|---|---|
| Percent absorber exhausted from bath | 62 | 61 | 48 | 37 | 18 |

The other ortho-hydroxy or o,o'dihydroxy compounds listed in column 1 may be used instead of these compounds above, to give useful results. Of especial importance are the alkenyloxybenzophenones such as 2,2'-dihydroxy-4,4'-diallyloxybenzophenone and 2,2'-dihydroxy-4-allyloxybenzophenone.

Example 6

The procedure of Example 1 is repeated except the UV absorber is dissolved in 5 ml. of ethyl alcohol instead of being pasted with the 12½ mg. of sodium dodecyl sulfate and the 12½ mg. of tetrasodium pyrophosphate in aqueous solution. When the alcohol solution of the absorber is added to the dyebath, a cloudy precipitate occurs, which is exceedingly finely divided.

Nylon, acetate, Orlon, Creslan and Dacron pieces (5 grams in each instance) are dyed by the procedure of Example 1 and the cloudiness of the bath disappears, indicating that the absorber has been picked up by the hydrophobic material.

The percent reflectance at 340 mµ indicates that appreciable quantities of the ultraviolet absorber have been picked up by the synthetic fiber.

Example 7

A solution of 1 part of sorbitan trioleate and 15 parts of 2,2'-dihydroxy-4-methoxybenzophenone in 50 parts of toluene is added to a solution of 5 parts of sodium lauryl sulfonate in 45 parts of water, under very heavy agitation. The resulting emulsion is diluted to 150 parts by volume with water, to give an emulsion containing 1 part of the benzophenone per 100 parts. This is used in the dyeings below.

Acetate tricot in 10 part swatches is dyed as follows. 0.1 part of the dyes listed below are dissolved in 400 parts of water. 0.25 part of tetrasodium pyrophosphate and 0.25 part of sodium lauryl sulfonate is added, followed by 40 parts of the above UV absorber emulsion. The acetate tricot is added after the dyebath has been heated to 110° F. and the bath is then heated to 180° F. for a short time (1 hour when parts are grams). The dyed fiber is then rinsed in warm water, then in cold water, and dried.

The dyeings are repeated without the addition of the UV absorber emulsion, to use as controls.

The dyes used were as follows: (Color Index references are to the 2nd Edition of the Color Index, 1957).

Calcosyn Sapphire Blue 2GS __ (C.I. Disperse Blue 3).
Calcosyn Green 2B _____ (C.I. Disperse Blue 7).
Calcosyn Orange G _____ (C.I. Disperse Orange 3).
Calcosyn Orange 3RC _____ (C.I. Disperse Orange 7).
Calcosyn Brilliant Scarlet BN _. (C.I. Disperse Red 1).
Calcosyn Brilliant Rubine R ___ (C.I. Disperse Red 21).
Calcosyn Red Violet R _____ (C.I. Disperse Violet 1).
Calcosyn Yellow GC _____ (C.I. Disperse Yellow 3).

Test of these dyeings show improved light fastness in the dyeings in which UV absorber was also present, as compared with the control.

Example 8

An emulsion is prepared by dissolving 14.7 parts of 2,2'-dihydroxy-4-methoxybenzophenone, 20 parts of dioctyl sodium sulfosuccinate, and 20 parts of the reaction product of p-octylphenol with 10 mols of ethylene oxide in 400 parts of methylsalicylate and stirring the solution into 440 parts of water vigorously.

Example 9

The procedure of Example 8 is followed using each of the following benzophenones in place of 2,2'-dihydroxy-4-methoxy benzophenone:

2-hydroxy-4-methoxybenzophenone
2,2'-dihydroxy-4,4'-dimethoxybenzophenone
2-hydroxy-4-methoxy-4-butylbenzophenone
2-hydroxy-4-methoxy-2',4'-dichlorobenzophenone 2,2'-dihydroxy-4-octoxybenzophenone
2,2'-dihydroxy-4-lauroxybenzophenone
2,2'-dihydroxy-4-butoxybenzophenone
2,2'-dihydroxy-4,4'-diallyloxybenzophenone

Example 10

Fifteen parts of 2,2'-dihydroxy-4-methoxybenzophenone is mixed with 167 parts of p-phenylphenol.

Example 11

The procedure of Example 8 is followed using (a) twice and (b) three times the quantity of the benzophenone derivative.

Example 12

The procedure of Example 8 followed omitting all benzophenone derivatives from the emulsion.

Example 13

Fifteen parts of 2,2'-dihydroxy-4-methoxybenzophenone is mixed in 167 parts of sodium o-phenylphenate.

Example 14

A dispersion of 0.0125 part of the dyestuff

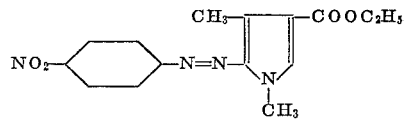

in 0.05 part of a polyoxyethylene ester of mixed fatty and resin acids is diluted with water to 200 parts by volume. Three parts of an emulsion carrier, identified below, is added. Into each such dyebath thus prepared, there is introduced a 5 part piece of glycol polyterephthalate. The bath is agitated at 200° F. for 1 hour, after which the fabric is rinsed, soaped at the boil, rinsed again, and dried.

The light-fastness is determined in a Fade-Ometer, with the following results.

| Dyeing Assistant | Percent UV Absorber (on weight of fiber) | Light Fastness |
|---|---|---|
| Example 12 | 0 | 2-3 |
| Example 8 | 1 | 3-4 |
| Example 11a | 2 | 3-4 |
| Example 11b | 3 | 3-4 |

Example 15

The procedure of Example 14 is followed, replacing the dispersion of 0.0125 part of that dye with one of 0.1 part of the dye

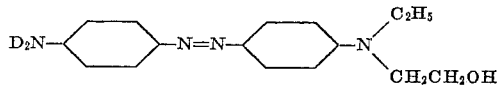

in 0.4 part of the dispersing agent. The dyeing assistants are those of Example 11b, Example 10 and Example 13. The dyeing assistants of Example 12 and unblended sodium-o-phenylphenate and p-phenylphenol serve as the controls.

The results are:

| Dyeing Assistant | Percent UV Absorber (on weight of fiber) | Light Fastness |
|---|---|---|
| Example 12 | 0 | 2-3 |
| Example 11b | 3 | 3 |
| sodium-o-phenylphenate | 0 | 1-2 |
| Example 13 | 3 | 2-3 |
| p-phenylphenol | 0 | 1-2 |
| Example 10 | 3 | 2-3 |

I claim:
1. A process of applying ultraviolet light absorbing materials of the structure:

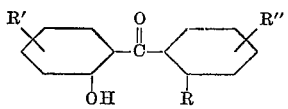

in which R is selected from the group consisting of hydrogen and hydroxyl and R' and R'' are each selected from the group consisting of hydrogen, alkoxy, alkenyloxy, chloro, bromo, alkyl, and hydroxyl, to hydrophobic polymeric materials selected from the group consisting of polyacrylonitriles, superpolyamides, superpolyesters, and cellulose acetate which comprises heating said polymeric material in an aqueous dispersion of said benzophenone above 140° F. while maintaining an agitated relationship between said polymeric material and said dispersion, followed by removing said polymeric material from said dispersion and subjecting said polymeric material to soaping and rinsing.

2. The process of claim 1 in which the aqueous dispersion is a stable oil-in-water emulsion of methyl salicylate and the said benzophenone.

3. The process of claim 1 in which the said polymeric material is in the form of fibers.

4. The process of claim 3 in which the polymer is polyglycol terephthalate.

5. The process of claim 3 in which the polymer is polyacrylonitrile.

6. The process of applying 2-hydroxybenzophenone to polyglycoterephthalate fibers which comprises heating said fibers in an aqueous dispersion of said benzophenone above 140° F. while keeping said fibers in an agitated relationship to said dispersion, followed by removing said polymeric material from said dispersion and subjecting said polymeric material to soaping and rinsing.

7. The process of applying 2,2'-dihydroxy-4-methoxybenzophenone to polyglycolterephthalate fibers which comprises heating said fibers in an aqueous dispersion of said benzophenone above 140° F. while keeping said fibers in an agitated relationship to said dispersion, followed by removing said polymeric material from said dispersion and subjecting said polymeric material to soaping and rinsing.

8. The process of applying 2,2'-dihydroxy-4,4'-dimethoxybenzophenone to polyglycolterephthalate fibers which comprises heating said fibers in an aqueous dispersion of said benzophenone above 140° F. while keeping said fibers in an agitated relationship to said dispersion, followed by removing said polymeric material from said dispersion and subjecting said polymeric material to soaping and rinsing.

9. The process of applying 2-hydroxy-4-methoxybenzophenone to polyacrylonitrile fibers which comprises heating said fibers in an aqueous dispersion of said benzophenone above 140° F. while keeping said fibers in an agitated relationship to said dispersion, followed by removing said polymeric material from said dispersion and subjecting said polymeric material to soaping and rinsing.

10. The process of applying 2,2'-dihydroxy-4-methoxybenzophenone to polyacrylonitrile fibers which comprises heating said fibers in an aqueous dispersion of said benzophenone above 140° F. while keeping said fibers in an agitated relationship to said dispersion, followed by removing said polymeric material from said dispersion and subjecting said polymeric material to soaping and rinsing.

11. The process of applying 2,2'-dihydroxy-4,4'-dimethoxybenzophenone to polyacrylonitrile fibers which comprises heating said fibers in an aqueous dispersion of said benzophenone above 140° F. while keeping said fibers in an agitated relationship to said dispersion, followed by removing said polymeric material from said dispersion and subjecting said polymeric material to soaping and rinsing.

12. A blend of at least 0.067% of the total weight of the blend of a benzophenone of the structure

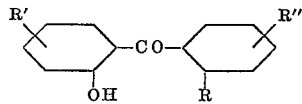

in which R is selected from the group consisting of hydrogen and hydroxyl, and R' and R'' are each selected from the group consisting of hydrogen, alkoxy, alkenyloxy, chloro, bromo, alkyl and hydroxyl, with an assistant for dyeing hydrophobic fibers.

13. A storage-stable, oil-in-water type emulsion comprising water, an anionic anionio surface-active emulsifying agent, and as the internal phase a lower alkyl ester of a carbocyclic aromatic monocarboxylic acid having not more than two carbocyclic rings, and a benzophenone of the structure

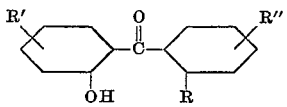

in which R is selected from the group consisting of hydrogen and hydroxyl and R and R' are each selected from the group consisting of hydrogen, alkoxy, alkenyloxy, chloro, bromo, alkyl and hydroxyl, the weight ratio of said emulsifying agent to said ester being from about 1:50 to 1:2, the proportion of said benzophenone to the total emulsion being at least 0.067%.

14. Emulsions of claim 13 in which the said ester is methyl salicylate and said benzophenone is 2,2'-dihydroxy-4-methoxy benzophenone.

15. Emulsions of claim 13 in which the said ester is methylsalicylate and the said benzophenone is 2,2'-dihydroxy-4,4'-dimethoxybenzophenone.

16. Emulsions of claim 13 in which the said ester is methylsalicylate and the said benzophenone is 2-hydroxy-4-methoxybenzophenone.

References Cited in the file of this patent
UNITED STATES PATENTS

| | | |
|---|---|---|
| 2,129,131 | Hunter | Sept. 6, 1938 |
| 2,364,112 | Van Every | Dec. 5, 1944 |
| 2,546,168 | Hart et al. | Mar. 27, 1951 |
| 2,682,559 | Stanley et al. | June 29, 1954 |
| 2,693,492 | Hoch | Nov. 2, 1954 |
| 2,725,390 | Fogelman et al. | Nov. 29, 1955 |
| 2,853,521 | Hardy et al. | Sept. 23, 1958 |
| 2,881,045 | Mecco et al. | Apr. 7, 1959 |
| 2,920,978 | Randall | Jan. 12, 1960 |
| 2,989,416 | Standish | June 20, 1961 |

UNITED STATES PATENT OFFICE
CERTIFICATE OF CORRECTION

Patent No. 3,049,443                      August 14, 1962

Ralph A. Coleman

It is hereby certified that error appears in the above numbered patent requiring correction and that the said Letters Patent should read as corrected below.

Column 3, line 29, for "2-hydroxy-4′-methoxy-2′,4-" read 2-hydroxy-4-methoxy-2′,4′- --; lines 54 and 55, for "it is not limited to use the hydrophobic" read -- it is not limited to the use of the hydrophobic --; column 8, lines 24 to 29, the formula should appear as shown below instead of as in the patent:

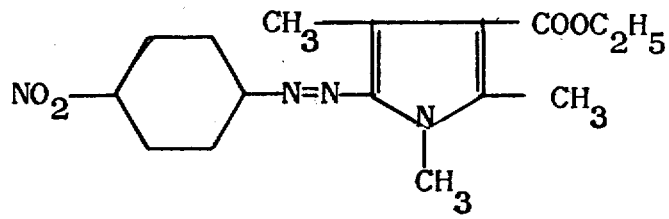

column 10, line 19, for "R and R″" read -- R′ and R″ --; line 24, strike out "anionio"; line 35, for "R and R′" read -- R′ and R″ --.

Signed and sealed this 3rd day of September 1963.

(SEAL)
Attest:

ERNEST W. SWIDER                      DAVID L. LADD

Attesting Officer                      Commissioner of Patents